US010161124B2

(12) United States Patent
Montestruque

(10) Patent No.: US 10,161,124 B2
(45) Date of Patent: Dec. 25, 2018

(54) SEWER OVERFLOW DISCHARGE MONITORING SYSTEM AND METHOD

(71) Applicant: EmNet, LLC, South Bend, IN (US)

(72) Inventor: Luis Montestruque, South Bend, IN (US)

(73) Assignee: EMNET, LLC, South Bend, IN (US)

( * ) Notice: Subject to any disclaimer, the term of this patent is extended or adjusted under 35 U.S.C. 154(b) by 565 days.

(21) Appl. No.: 14/332,366

(22) Filed: Jul. 15, 2014

(65) Prior Publication Data
US 2015/0019146 A1    Jan. 15, 2015

Related U.S. Application Data

(60) Provisional application No. 61/846,522, filed on Jul. 15, 2013.

(51) Int. Cl.
| *E03F 7/04* | (2006.01) |
| *E03F 5/12* | (2006.01) |
| *G01F 1/00* | (2006.01) |
| *G01F 15/00* | (2006.01) |
| *G01F 15/06* | (2006.01) |

(52) U.S. Cl.
CPC .................. *E03F 7/04* (2013.01); *E03F 5/12* (2013.01); *G01F 1/002* (2013.01); *G01F 15/005* (2013.01); *G01F 15/063* (2013.01); *E03F 2201/20* (2013.01)

(58) Field of Classification Search
CPC ......................................................... E03F 7/04
USPC ............................................................ 702/45
See application file for complete search history.

(56) References Cited

U.S. PATENT DOCUMENTS

| 6,009,762 A * | 1/2000 | Ockleston ............... G01F 1/002 |
| | | 73/861.71 |
| 7,792,126 B1 * | 9/2010 | Montestruque ........... E03F 7/00 |
| | | 370/386 |
| 7,944,352 B2 * | 5/2011 | Drake ................... G01F 15/063 |
| | | 340/539.26 |
| 2007/0021936 A1 * | 1/2007 | Marovitz .................. E03F 7/00 |
| | | 702/100 |
| 2008/0083464 A1 * | 4/2008 | Shimizu .................. E03F 1/006 |
| | | 137/527 |

* cited by examiner

*Primary Examiner* — Ricky Ngon
(74) *Attorney, Agent, or Firm* — EcoTech Law Group, P.C.

(57) ABSTRACT

A method and a system for monitoring the performance of combined sewer overflow structures is described. The inventive system includes sensors for monitoring the level of sewage in the structure and the operation of valves. A data processing unit collects data and calculates the flow of an overflow event and/or the performance of gate valves. The system may be battery operated and may adaptively change the sensor sampling time to prolong battery lifetime.

8 Claims, 4 Drawing Sheets

SEWER OVERFLOW DISCHARGE MONITORING SYSTEM AND METHOD

CROSS-REFERENCE TO RELATED APPLICATIONS

This application claims the benefit of U.S. Provisional Application No. 61/846,522, filed Jul. 15, 2013, the contents of which are hereby incorporated by reference in its entirety.

BACKGROUND OF THE INVENTION

Field of the Invention

The present invention generally relates to a sewer overflow discharge monitoring system. More specifically, it relates to systems and methods using levels and tilt measurements to monitor sewer overflow discharges from structures protected with tidal or river inflow flap gates Discussion of the Background In many cities wastewater and rainwater are collected together in a combined sewer system. To prevent localized flooding in basements and streets during a heavy rain event, these combined waters are usually diverted into a local river or stream, thereby creating a combined sewer overflow (CSO) event.

Because these waters are highly impacted with chemical and biological contaminants, CSO events pose a major public health hazard. The United States Environmental Protection Agency (USEPA) issues all wastewater utilities in the United States a National Pollutant Discharge Elimination System (NPDES) permit. This permit typically requires a utility to report the occurrence, timing, and estimated volume of CSO discharges in a regular basis.

The report, called a Discharge Monitoring Report (DMR), increasingly requires electronic real-time data from the sewer system be sent to the utility. The NPDES permit typically also requires that the utility provide near real-time public notification of CSO events to reduce the possibility of human contact with untreated wastewater in recreational waters.

Conventional CSO structures are composed of a regulator, such as a weir, that diverts wastewater to a pipe, referred to as a CSO pipe, which acts as a relief point to the sewer system. The CSO pipe typically conveys the excess wastewater to a water body such as a river, lake, or the sea.

In certain instances the CSO structure can be influenced by the water body into which the CSO discharges. In these situations it is customary to use a flap gate to prevent river, lake or sea water from entering the sewer system. Monitoring these kinds of CSO structures is challenging. For example, some of these water bodies may experience high tide. During a high tide CSO event, significant turbulence in the CSO structure can preclude the use of certain meters. One example is area-velocity flow meters typically used to quantify CSO incidents. In addition, wave action in the receiving water body can generate oscillations on the flap gate in the CSO structure. It would be desirable to have a CSO structure that addresses these issues and concerns that arise with conventional CSO structures, particularly with respect to the effects of the external water body.

BRIEF SUMMARY OF THE INVENTION

The present invention overcomes the disadvantages of prior art by providing monitoring of CSO incidents. Thus, for example, a system is provided that can determine the time and magnitude of such an incident from measurements in the field. The system may also determine and provide an indication when the flap gate is not operating properly, and which may need repairs to prevent receiving water inflows to the sewer system.

Embodiments of the present invention provide a sewer overflow discharge monitoring system and related methods. The sewer overflow discharge monitoring system and methods are implemented to accurately measure the occurrence, timing, and volume of CSO discharges in CSO structures with flap gates. In one embodiment, the sewer overflow discharge monitoring system includes a set of sensors, a data processing device, and a telemetry system. The set of sensors further include a level sensor in the regulator chamber, a level sensor in the CSO chamber, and a tilt sensor for each flap gate in the CSO structure. The data processing device provides power management, adaptive sampling, and overflow volume calculation based on data acquired from the set of sensors. The telemetry system provides real time reporting of CSO occurrence, timing, and volume to the utility.

It is one aspect of the present invention to provide a system to monitor the operation of one or more flap gates operating in parallel between an upstream sewer location and a downstream sewer location. The system includes: sensors for generating measurements of an upstream liquid level at an upstream sewer location, a downstream liquid level at a downstream sewer location, and an indication of the degree of opening of each of the one or more flap gate; and a data processing device to sample the measurements and programmed to estimate the volume of sewer discharge from the sampled measurements.

It is another aspect of the present invention to provide a system to monitor the operation of one or more flap gate operating in parallel between an upstream sewer location and a downstream sewer location. The system includes: sensors for generating measurements of an upstream liquid level at an upstream sewer location, a downstream liquid level at a downstream sewer location, and an indication of the degree of opening of each of the one or more flap gates; and a data processing device adapted to sample the measurements and programmed to determine if one or more of the flap gates is not operating properly.

It is yet another aspect of the present invention to provide a method for reporting CSO events using a sewer overflow discharge monitoring system, The method includes: measuring liquid levels and the degree of opening of one or more flap gates in a CSO structure; determining the performance of the CSO structure; and storing the determined performance a data processing unit.

An advantage of the sewer overflow discharge monitoring system is the calculation of CSO occurrence, timing and volume when the flap gate is affected by the water level in the receiving water body.

Another advantage of the sewer overflow discharge monitoring system is the calculation of CSO occurrence, timing, and volume when the flap gate is affected by waves in the receiving water body.

A further advantage of the sewer overflow discharge monitoring system is the calculation of CSO occurrence, timing, and volume when turbulence is present around the flap gate.

Yet another advantage of the sewer overflow discharge monitoring system is the ability to be battery operated for extended periods of time.

Still another advantage of the sewer overflow discharge monitoring system is the ability to determine if the flap gates are operating correctly.

These features together with the various ancillary provisions and features which will become apparent to those skilled in the art from the following detailed description, are attained by the CSO structure and method of the present invention, preferred embodiments thereof being shown with reference to the accompanying drawings, by way of example only, wherein:

Reference symbols are used in the Figures to indicate certain components, aspects or features shown therein, with reference symbols common to more than one Figure indicating like components, aspects or features shown therein.

DETAILED DESCRIPTION OF THE INVENTION

In general, CSO structures, also referred to as CSO diversion structures, control the flow of sewage between one or more inputs and two outputs depending of factors which include the flow rates and conditions downstream of the CSO structure. One embodiment of a CSO structure 100 is illustrated in FIG. 1, as a top view of a schematic of a first embodiment CSO structure, in FIGS. 2 and 3, which are sectional views 2-2 and 3-3 of FIG. 1, respectively, and in FIG. 4, which is a top view 4-4 of FIG. 3 illustrating the flow through the CSO structure.

Figure 1:
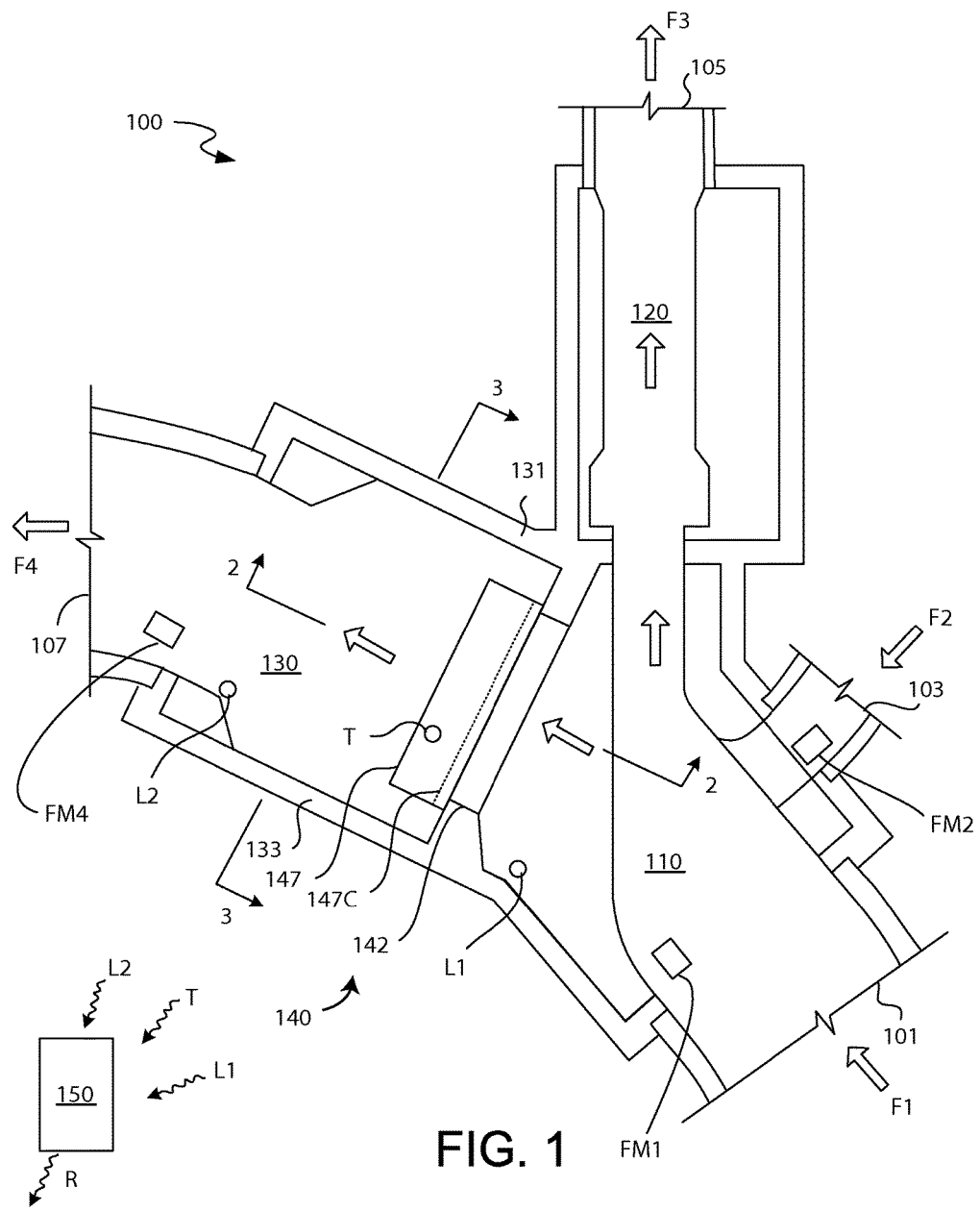
FIG. 1 is a top view of a schematic of a first embodiment CSO structure of the present invention.

As shown in FIG. 1, one embodiment CSO structure 100 includes a first chamber 110 (also referred to herein, without limitation, as a CSO chamber) having a first input 101 and a second input 103, a regulator 120 having a first output 105, and a second chamber 130 (also referred to herein, without limitation, as the "regulator chamber"), which may be a tide gate chamber to conveys the excess wastewater to a water body such as a river, lake, or the sea, having a second output 107.

Figure 2:
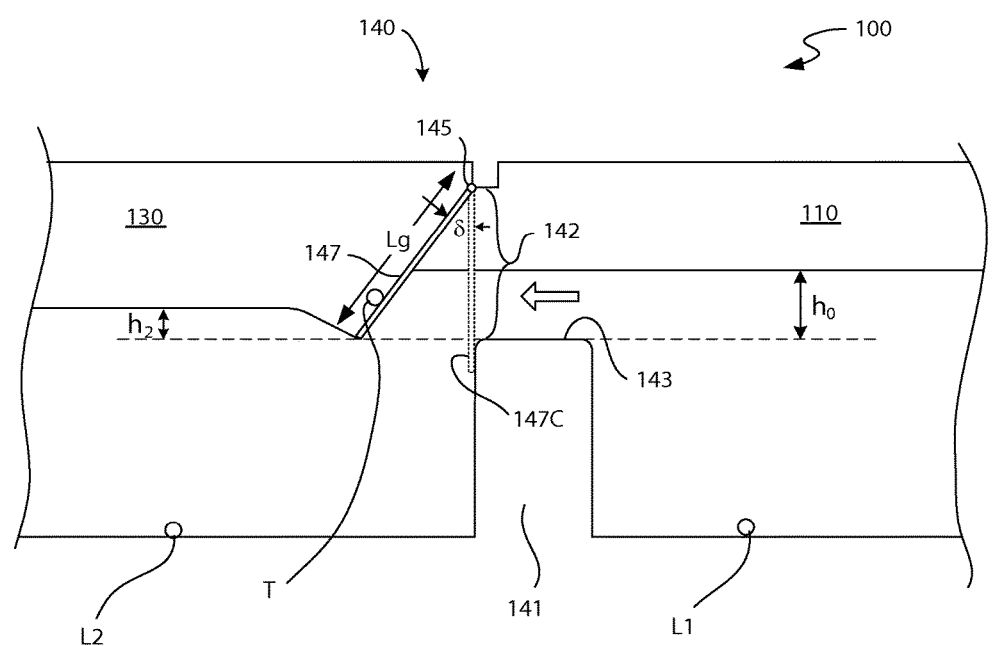
FIG. 2 is a sectional view 2-2 of FIG. 1.
Figure 3:
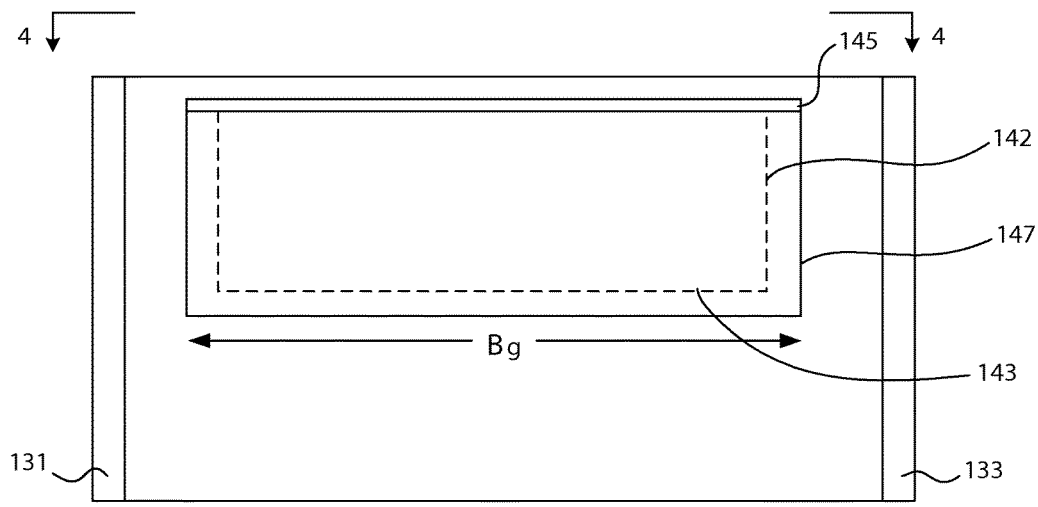
FIG. 3 is a sectional view 3-3 of FIG. 1.

A valve 140 is located between first chamber 110 and second chamber 130, as shown in greater detail in FIGS. 2 and 3. Valve 140 includes an opening 142 which includes a weir crest 143 of a weir 141. An upper portion of opening 142 includes a hinge 145 that supports a flap gate, also referred to herein as a gate 147.

As shown in FIGS. 2 and 3, gate 147 is sized to completely cover opening 142, as shown in the position indicated in dashed lines as gate 147C in a closed position, and may rotate an angle $\delta$ about hinge 145 to an open position, shown in solid lines as gate 147.

In general, the regulator 120 controls the hydraulic level in CSO structure 100 by means of a weir located at opening 142. When the water level in the regulator chamber exceeds the weir crest level, then water can leave the sewer system by entering the CSO chamber or pipe which leads to the receiving water body. A flap gate separating the regulator and CSO chamber allows water to leave the sewer system but prevents water from entering sewer system if the receiving water body elevation is high.

The figures also show the flow of material through CSO structure 100. Thus, for example, a flow $F_1$, enters CSO structure 100 through first input 101 and a flow $F_2$, enters the CSO structure through second input 103. Flows $F_1$ and $F_2$ may be, for example and without limitation a combination of raw sewage and rain water. An outflow $F_3$ exits through first output 105 and, depending on the operation of CSO structure 100, as describe subsequently, an outflow $F_4$ may exit through second output 107.

Figure 4:
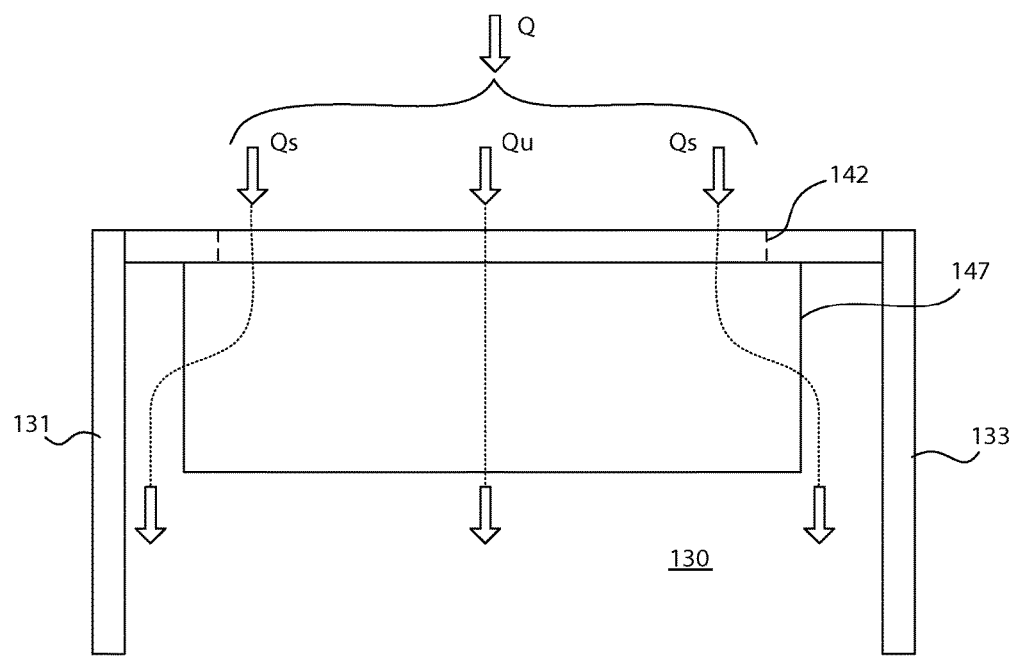
FIG. 4 is a top view 4-4 of FIG. 3 illustrating the flow through the CSO structure.

Flow through opening 142 is governed, in part, by the angle $\delta$ of gate 147. When the liquid level in first chamber 110 is higher than the liquid level in second chamber 130, liquid may flow though opening 142, as shown in FIGS. 2 and 4.

It is to be understood CSO structure 100 is adapted to handling sewage and liquid run-off. As such, the term "liquid" as used herein, unless otherwise explicitly stated, includes whatever might be found in sewage, such as suspended or non-suspended solid materials.

It is preferable that gate 147 acts as a one-way valve, permitting flow from first chamber 110 to chamber 130 only when the angle $\delta$ is non-zero. Thus, under normal operating conditions, the liquid levels in chambers 110 and 130 govern the angle $\delta$, and prevent the flow of liquid from chamber 130 back into chamber 110. However, if gate 147 does not move freely or is prevented from closing due to solids in the sewage, hinge 145 may fail to provide such freedom of motion, or gate 147 may otherwise be prevented from covering opening 142. The condition may allow for a back flow of sewage through the opening. This situation is to be avoided as it may allow water from the receiving body to enter the sewer system.

Figure 5:
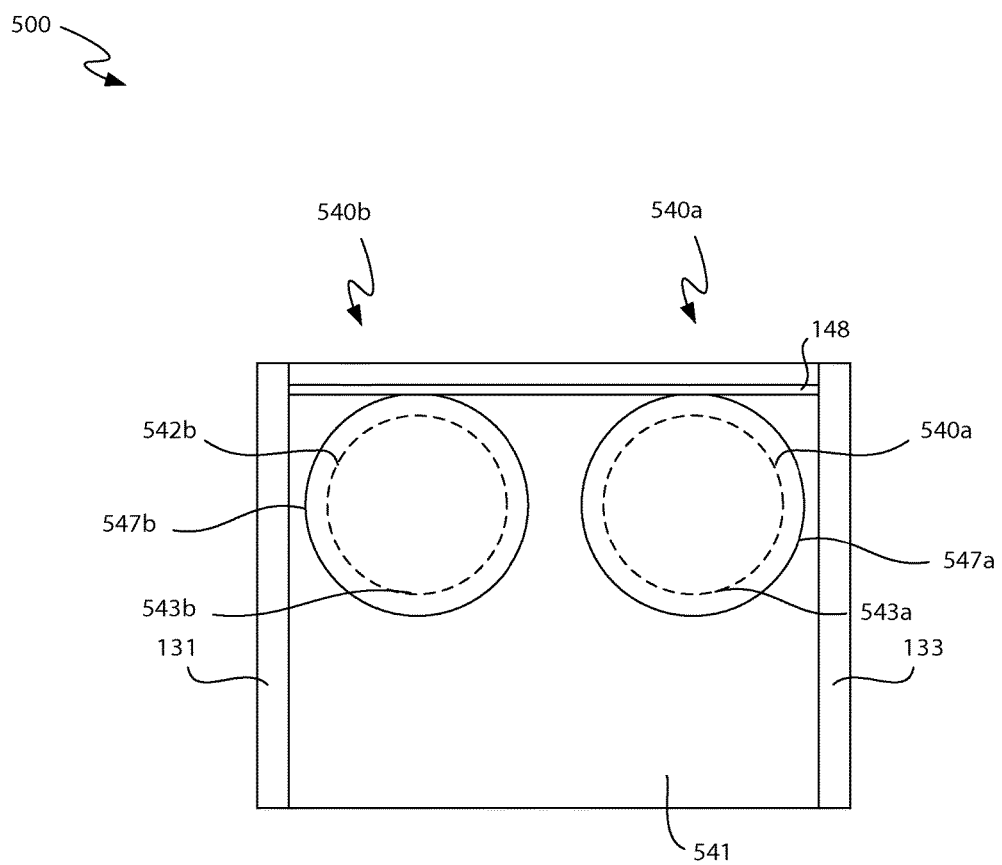
FIG. 5 is a sectional view 3-3 of a schematic of a second embodiment CSO structure of the present invention.

Another embodiment of a CSO structure 500 is illustrated in FIG. 5, as a sectional view 3-3 of a schematic of a second embodiment CSO structure of the present invention. CSO structure 500 is generally similar to CSO structure 100 except as explicitly noted subsequently.

As shown in FIG. 5, CSO structure 500 differs from CSO structure 100 in that it includes two valves 540 which are generally similar to valve 140: a first valve 540a having a first opening 542a, and a second valve 540b having a second opening 542b. CSO structure 500 also includes gates 547, similar to gate 147 for each opening, specifically a first gate 547a over first opening 542a and a second gate 547b over second opening 542b. Gates 547 both completely cover their respective opening 542 when closed and can open by some angle around hinge 145 to permit flow through the openings. CSO structure 500 further includes a weir 541, which is generally similar to weir 151, and has a weir crest 543a associated with valve 540a and a weir crest 543b associated with valve 540b.

CSO structure 500 is meant to be illustrative, and in general a CSO structure may have any number of openings, such as 3, 4, 5, 6 or more openings, each of which allow flow in parallel.

In addition, CSO structure 500 shows circular openings 542. The shape of the openings is a matter of design for flow of liquid, and does not limit the scope of the present invention in any way. Thus, for example and without limitation, openings 142 or 542 may be rectangular, square, circular, oval, or any other shape conducive to liquid flow, with the bottom-most portion of the openings form a weir over which liquid may flow.

Various embodiments include the determination of the performance of a CSO structure, which may include, without limitation, liquid levels, flow rates, and whether valves in the structures are working properly. The performance of the CSO structure may be stored in a computer, such as data processing unit 150, or may be transmitted from the data processing unit to another system for monitoring such structures. Data processing unit 150 may include one or more of the following components: a programmable processor, computer memory, wired or wireless networking hardware for communicating with sensors and/or other computer systems, and/or batteries.

CSO structures 100 and 500 includes sensors to: 1) measure the liquid level of sewage upstream of valve 140/540 in first chamber 110, indicated as a level sensor $L_1$; 2) measure the liquid level of sewage downstream of valve 140/540 in second chamber 130, indicated as a level sensor $L_2$; and 3) a measure of the degree of openness of each gate 147/547, indicated as $T_i$, where i corresponds to the total number of gates. CSO structures 100/500 also include a data processing device 150 which may receive signals, either wired or wirelessly, from the sensors, process data, and provide a report either wired or wirelessly and indicated as signal R, to a warning system or another computing system.

In one embodiment, data processing device 150 calculates: $h_0$, the liquid height above the weir crest in chamber 110, from sensor $L_1$; $h_2$, the liquid height above the weir crest in chamber 130 from sensor $L_2$, and an opening angle for each gate $\delta_i$ from sensors $T_i$.

The measuring of liquid levels is well known, and conventional technologies exist for sensors $L_1$ and $L_2$. Ultrasonic, pressure, and radar based sensors are all suitable technologies to measure water levels. There are also conventional technologies that can be used to measure of the degree of openness of the gates, and sensor $T_i$ may, for example and without limitation, measure the tilt or inclination of the gate. Force balance, liquid capacitive, and piezoelectric based sensors are all suitable technologies to measure tilt or inclination.

Optionally, CSO structures 100 and 500 may include flow meters such as $FM_1$, $FM_2$ and $FM_4$ to measure the actual flow rate of flows $F_1$, $F_2$, and $F_4$, respectively. The flow meters may be used, for example and without limitation, to calibrate the flow through valves 140 to provide a calibration of the methods described herein for estimating the flow rates based on the measurements using $L_1$, $L_2$, and $T_i$, such as by calculating a discharge coefficient C. In addition, the flow meters may be used to measure the kinetic energy from upstream of the valve which may force the gate open.

In one embodiment of the present invention, data processing unit 150 is programmed to collect data from sensors $L_1$, $L_2$, and $T_i$ and calculate the instantaneous flow through the valves 140/540. Thus, for example, the output of sensors $L_1$, $L_2$, and $T_i$ may be used to calculate the flow through valves 140/540. A non-zero flow is an indication that a CSO event has occurred, which may be stored in data processing unit 150 or reported as signal R. The integral of the instantaneous flow provides a total volume of the CSO event, which can also be data processing unit 150 or reported as signal R.

In general, the instantaneous volumetric flow rate Q through valves 140/540 may be related, through theoretical calculation, calibration, correlation, or some combination thereof, indicated as: $Q=Q(L_1, L_2, T_i)$, or $Q=Q(h_0, h_2, \delta_i)$. Thus, for example, measurements of $h_0$, $h_2$, $\delta_i$ may be correlated or calibrated against flow sensors $FM_1$ and $FM_2$ to provide an indication of the instantaneous flow rate.

An alternative example of a more theoretical approach to obtaining $Q=Q(h_0, h_2, \delta_i)$ for CSO structure 100 follows. As the basis for the following calculation, the flow through the gate is assumed to be composed of a first flow $Q_u$ that flows under the gate (as in an infinitely long gate), and a second flow $Q_s$ that flows along the sides of the gate. The instantaneous flow can be decomposed as:

$$Q=Q_u+Q_s=(Q_{uf}+Q_{sf})S(s), \quad (0.1)$$

where $Q_u$ is the flow under the gate and $Q_s$ is the side gate flow (as shown in FIG. 4), $Q_{*f}$ are the flows under free flow conditions (no tidal influence), and S (s) is the submerged ratio defined as:

$$S(s) = \sqrt{1-s} = \sqrt{1-\frac{h_2}{h_0}}, \quad (0.2)$$

where $h_0$ is the head above the weir crest 143 in regulator chamber 110 and $h_2$ is the head above the weir crest in CSO chamber 130, as shown in FIG. 2.

Under free flow conditions, the flow under the gate is provided as follows by Equation (1.3) and the flow along the sides of the gate is provided as follows by Equation (1.4):

$$Q_{uf} = 2CB_g L_g \sin\left(\frac{\delta}{2}\right)\sqrt{2gh_0} \quad (0.3)$$

$$Q_{sf} = 2C\sqrt{2g}\begin{bmatrix}\left(\frac{4}{15}h_0^{5/2} - \frac{2}{5}(h_0-U_v)^{3/2}\left(\frac{2}{3}h_0+U_v\right)\right)\tan\left(\frac{\delta}{2}\right)+ \\ \frac{2}{3}(U_h+U_v\tan(\delta))(h_0-U_v)^{3/2} - \\ \frac{2}{5}\tan(\delta)(h_0-U_v)^{3/2}\left(\frac{2}{3}h_0+U_v\right)\end{bmatrix} \quad (0.4)$$

Where C is the discharge coefficient, $B_g$ is the gate width (as shown in FIG. 3), $L_g$ is the gate length (as shown in FIG. 2), $\delta$ is the gate opening (as shown in FIG. 2), $U_v$ is a vertical projection of the gate opening, and $U_h$ is a horizontal projection of the gate opening calculated as:

$$U_v = L_g(1-\cos(\delta)) \quad (0.5)$$

$$U_h = L_g \sin(\delta)$$

The discharge coefficient C can be obtained from the characteristics of the weir. However, the discharge coefficient can be calibrated from observations performed by a flow meter located downstream of the flap gate, as discussed above. Since the level of the receiving water body (e.g., river, stream, sea, etc.) does not affect the discharge coefficient, the flows measured during CSO events with low receiving water body levels can be used to easily calibrate the discharge coefficient.

$$Q = \sqrt{1-\frac{h_2}{h_0}}\left[2C\sqrt{2g}\begin{bmatrix}\left(\frac{4}{15}h_0^{5/2} - \frac{2}{5}(h_0-U_v)^{3/2}\left(\frac{2}{3}h_0+U_v\right)\right)\tan\left(\frac{\delta}{2}\right)+ \\ \frac{2}{3}(U_h+U_v\tan(\delta))(h_0-U_v)^{3/2} - \\ \frac{2}{5}\tan(\delta)(h_0-U_v)^{3/2}\left(\frac{2}{3}h_0+U_v\right)\end{bmatrix} + 2CB_g L_g \sin\left(\frac{\delta}{2}\right)\sqrt{2gh_0}\right]$$

$$U_v = L_g(1-\cos(\delta)),\ U_h = L_g\sin(\delta)$$

It has been assumed in the calculations represented by Equations 1.1 to 1.5 that the momentum of the flows in the regulator chamber does not affect the hydraulics of the system. In cases where large velocities are observed entering the regulator chamber, a flow meter upstream of the flap gate can be used to measure the flow velocities, and an added term may be added to the regulator head $h_0$ calculation to compensate for the flow momentum. Thus, for example, the value of $h_0$ in the above equations may be modified by adding a term dependent on $FM_1$ such as a function of $FM_1^2$ and $h_0$.

In addition, to determining the flow rate, a theoretical calculation, calibration, correlation, or some combination thereof, may be used to determine the degree of opening of individual gates. As one example of this calculation, the following results from a momentum balance on one gate resulting from the forces from the liquid on either side and gravitational forces:

$$\left(\frac{\delta g B_g}{6\cos(\delta)}\right)(3L_g^2(h_0 - h_2)\cos^2(\delta) + (L_g - h_0)^3 - (L_g - h_2)^3) - \frac{L_g}{2}mg\sin(\delta) = 0 \qquad (0.6)$$

Using the dimensions of the gate and the measured values of $h_0$ and $h_2$, Equation 1.6 may be solved for a theoretical value of $\delta$, which will be denoted herein as $\delta^*$. If the gate and flow are in steady state and if the gate free to swing on hinge 145, then as $\delta^*$ should be close to the value of $\delta$ measured using T. If, however, there is a large deviation, or if Equation 1.6 does not yield a real and meaningful solution, then it is likely that the gate is stuck and data processing unit 150 can then provide warning that the gate is stuck and/or damaged.

The hydraulic levels in CSO chambers can change dramatically in short periods of time. Wave action, turbulence and other disturbances can produce fast water changing levels and gate inclinations. To compensate for these changes, the data processing unit must sample the sensors faster than the rate of change in hydraulic and inclination parameters. Wave periodicity can be as frequent as 10 seconds per cycle.

Data processing unit 150 may incorporate a data transceiver such as a cellular modem to transmit the data in real time to utility staff.

The installation of the sewer overflow discharge monitoring system described here using conventional technologies can be expensive due to the need to install an instrumentation cabinet and utility power to house the processing unit. Utility power is needed to allow for the fast sampling rate required by the sewer overflow discharge monitoring system to compensate for fast changing levels or flap gate inclination. To significantly reduce costs, the data processing device can be battery operated. To allow for battery operation, the data processing unit needs to provide power management for the instrumentation.

In a sewer overflow discharge monitoring system with power management, the data processing unit would power and sample the sensors only when needed. Assuming that CSO events are relatively rare, the data processing unit can sample the sensors at a lower frequency when the possibility of a CSO event occurring is low. When the regulator chamber approaches the weir level and if the flap gate is registered as open, the data processing unit can initiate an energy intensive fast sampling rate. Similarly, the data processing unit can transmit data at lower frequency intervals when no overflows are detected and increase the transmission rate when overflows are detected.

The following are examples of steps that data processing unit 150 may perform to sample, store, and/or report data via signal R, to a utility or other entity tasked with monitoring sewer conditions. Specifically, in one embodiment, one or more of the following steps are performed.

Step 1: Data processing unit 150 provides power to sensors $L_1$, $L_2$, and $T_i$ and waits for the sensors to take measurements. Data processing unit 150 collects the measurements and powers down sensors $L_1$, $L_2$, and $T_i$.

Step 2: Data processing unit 150 repeats Step 1 at a regular interval, such as every 5 minutes or any suitable time interval for that particular sewer overflow monitoring system.

Step 3: Data processing unit 150 determines if an overflow is occurring based on sensor measurements—that is, if sensors $T_i$ indicate that a gate is open.

Step 4: If data processing unit 150 determines that an overflow is occurring, then while an overflow is occurring, the data processing unit adjusts the sampling rate and repeats step 1 every 10 seconds or at any suitable time interval.

Step 5: Each time data processing unit 150 collects data from the sensor, the data processing unit determines the time that the overflow occurred and the overflow rate, based, for example and without limitation, on one of the calculations described herein.

Step 6: Data processing unit 150 stores within memory of the unit, the calculated overflow flow. The stored flow may be the flow rates averaged over some time period. Thus, for example, if the data processing unit is collecting data at the accelerated time interval (e.g., every 10 seconds), then an average the overflow flow rate over the initial time interval (e.g., 5 minute period) may be calculated and stored in memory.

Step 7: If data processing unit 150 is collecting data at the initial time interval (e.g., 5 minutes), then it initiates transmission of data, R, to utility staff at an extended time interval (e.g., every 3 hours). Otherwise, the data processing unit will transmit data at the initial time interval (5 minutes).

At every data transmission to the utility staff, the data processing unit powers the telemetry system. The data processing unit then waits for the telemetry system to connect to the data network. Then the data processing unit retrieves and transmits all data points that have not been transmitted up to this point. Then the data processing unit powers down the telemetry system.

The data processing unit goes into power saving mode until it is required to proceed with Step 1.

One embodiment of each of the methods described herein is in the form of a computer program that executes on a processing system, e.g., a one or more processors or computers that are part of a data processing system. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

I claim:

1. A warning system that warns when sewage gate is not operating properly, said system comprising:
    an upstream sensor for measuring an upstream liquid height at a location upstream from sewage gate;
    a downstream sensor for measuring an downstream liquid height at a location downstream from sewage gate;
    a gate sensor for providing an indication of an actual degree of opening of sewage gate; and
    a processor for processing code;
    memory, coupled to said processor, for storing code to be executed by said processor; and
    wherein said processor operative to perform the functions of:
        receiving data from said upstream, downstream and gate sensors at one or more instances in time, wherein said data from said gate sensor allows computation of actual degree of opening of sewage gate at one or more instances in time;
        deducing, using said data received from said upstream and said downstream sensors, a theoretical degree of opening of sewage gate at one of said one or more instances in time, and wherein said theoretical degree of opening "δ" is solved from:

$$\left(\frac{\partial g B_g}{6\cos(\delta)}\right)(3L_g^2(h_0 - h_2)\cos^2(\delta) + (L_g - h_0)^3 - (L_g - h_2)^3) - \frac{L_g}{2}\text{mgsin}(\delta) = 0$$

wherein "$B_g$" is the gate width, "g" is gravity, "$L_g$" is a gate length, "$h_0$" is a liquid height above a weir crest at said upstream sewer location, and "$h_2$" is a liquid height above said weir crest at said downstream sewer location;
        determining, at one of said one or more instances in time, a difference between said theoretical degree of opening of sewage gate and said actual degree of opening of said sewage gate to arrive at a gate opening deviation; and
        providing a warning that sewage gate is not operating properly when said gate opening deviation is greater than a predetermined amount.

2. The system of claim 1, wherein said system includes a telemetry system that reports if sewage gate is not operating properly.

3. The system of claim 1, wherein said processor further operative to perform the functions of:
    instructing transmission of power, after a first time duration, to said sensors to allow said sensors to take measurements and acquire said received data;
    determining, after lapse of said first time duration and using said received data, if overflow conditions exist;
    repeating said instructing and said determining after lapse of a second time duration, which is shorter than said first time duration, if said overflow conditions exist; and
    repeating said instructing and said determining after lapse of said first time duration, if said overflow conditions do not exist.

4. The system of claim 1, wherein said system includes a telemetry system that transmits said data in real time to utility staff or another processor.

5. The system of claim 1, wherein said system adjusts a rate at which said data is sampled by said data processing device.

6. The system of claim 1, wherein said system is powered by one or more batteries.

7. The system of claim 1, further comprising a flow meter upstream gates, wherein said flow meter is used to calibrate for flow momentum.

8. The system of claim 1, further comprising a flow meter downstream of sewage gate, wherein said flow meter is used to calibrate a discharge coefficient of sewage gate.

* * * * *